(12) United States Patent
Kim

(10) Patent No.: US 8,507,129 B2
(45) Date of Patent: Aug. 13, 2013

(54) RECHARGEABLE BATTERY

(75) Inventor: Duk-Jung Kim, Yongin-si (KR)

(73) Assignees: Samsung SDI Co., Ltd., Yongin-Si, Gyeonggi-Do (KR); Robert Bosch, GmbH, Stuttgart (DE)

(*) Notice: Subject to any disclaimer, the term of this patent is extended or adjusted under 35 U.S.C. 154(b) by 135 days.

(21) Appl. No.: 13/064,946

(22) Filed: Apr. 27, 2011

(65) Prior Publication Data
US 2012/0040240 A1 Feb. 16, 2012

(30) Foreign Application Priority Data
Aug. 16, 2010 (KR) .................. 10-2010-0078850

(51) Int. Cl.
*H01M 2/08* (2006.01)
*H01M 2/30* (2006.01)

(52) U.S. Cl.
USPC .............. 429/175; 429/178; 429/179; 29/246

(58) Field of Classification Search
None
See application file for complete search history.

(56) References Cited

U.S. PATENT DOCUMENTS

| | | | | |
|---|---|---|---|---|
| 4,042,759 | A | * | 8/1977 | Cella .............................. 429/121 |
| 7,642,008 | B2 | * | 1/2010 | Kim et al. ...................... 429/181 |
| 2010/0233527 | A1 | * | 9/2010 | Meschter et al. ............. 429/178 |
| 2011/0244310 | A1 | * | 10/2011 | Kim ............................... 429/158 |

FOREIGN PATENT DOCUMENTS

| | | |
|---|---|---|
| JP | 09-147832 A | 6/1997 |
| JP | 2000-215880 A | 8/2000 |
| KR | 2006-0060801 A | 6/2006 |

* cited by examiner

*Primary Examiner* — Ula C Ruddock
*Assistant Examiner* — Lisa S Park Gehrke
(74) *Attorney, Agent, or Firm* — Lee & Morse, P.C.

(57) ABSTRACT

A rechargeable battery including an electrode assembly including a positive electrode and a negative electrode formed on both surfaces of a separator; a case accommodating the electrode assembly; a cap plate closing an opening of one side of the case; and an electrode terminal installed to the cap plate, wherein the electrode terminal includes a first terminal part installed to a terminal hole of the cap plate, connected to the electrode assembly inside the case, and protruding outside the cap plate thereby forming a first connection portion, a second terminal part forming a second connection portion coupled to the first connection portion in a first direction determined along a length of the electrode terminal and protruding from the first terminal part, and a fastener coupling the first connection portion and the second connection portion in a second direction intersecting the first direction.

15 Claims, 9 Drawing Sheets

RECHARGEABLE BATTERY

BACKGROUND

1. Field

Embodiments relate to a rechargeable battery.

2. Description of the Related Art

A rechargeable battery may include a jelly roll-type electrode assembly having a wound positive electrode and negative electrode at sides of a separator, a case accommodating the electrode assembly, a cap plate sealing an opening of the case, and an electrode terminal electrically connected to the electrode assembly.

For example, the electrode terminal may be connected to the positive electrode and the negative electrode of the electrode assembly by a lead tab in the case and may protrude outside the cap plate through a terminal hole therein. The electrode terminal may include a bolt portion outside the cap plate. A bus bar may be installed at the bolt portion and a nut may be coupled to the bolt portion. Thus, the bus bar may couple the rechargeable batteries in series or in parallel.

The rechargeable battery may include a bolt-nut structure outside of the case, and the electrode terminal thereof may be connected to a lead tab inside the case through, e.g., caulking, riveting, or welding.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly including a positive electrode and a negative electrode formed on both surfaces of a separator; a case accommodating the electrode assembly; a cap plate closing an opening of one side of the case; and an electrode terminal installed to the cap plate, wherein the electrode terminal includes a first terminal part installed to a terminal hole of the cap plate, connected to the electrode assembly inside the case, and protruding outside the cap plate thereby forming a first connection portion, a second terminal part forming a second connection portion coupled to the first connection portion in a first direction determined along a length of the electrode terminal and protruding from the first terminal part, and a fastener coupling the first connection portion and the second connection portion in a second direction intersecting the first direction.

The fastener may penetrate the first connection portion and the second connection portion in the second direction to couple the first terminal part and the second terminal part.

The first connection portion may include a depression, and the second connection portion may include a projection coupled to the first connection portion.

The first connection portion may include a supporting depression opened at an outer surface of the first terminal part, and a coupling groove extended in a third direction intersecting the second direction at the supporting depression, and the second connection portion may include a supporting portion inserted into the supporting depression, and a coupling protrusion extended in the third direction at the supporting portion and inserted into the coupling groove.

The coupling groove may have a depth in the first direction that is deeper than a depth of the supporting depression, and the coupling protrusion may have a height in the first direction that is greater than a height of the supporting portion.

The fastener may include a pin inserted into a first coupling hole in the first terminal part and connected to the coupling groove, and a second coupling hole in the coupling protrusion.

The coupling groove may include a first coupling groove and a second coupling groove at respective sides in the third direction of the supporting depression, and the coupling protrusion may include a first coupling protrusion and a second coupling protrusion at respective sides in the third direction of the supporting portion and coupled to the first coupling groove and the second coupling groove, respectively.

The fastener may include a first pin and a second pin at sides of the first terminal part along the third direction, the first pin may be inserted into a first coupling hole and a second coupling hole in the second direction at one side between both sides in the third direction, and the second pin may be inserted into a first coupling hole and a second coupling hole in the second direction at another side in the third direction.

The rechargeable battery may further include a lid covering the fastening member and snap-fit coupled to the retainer, wherein the lid covers the first coupling groove and the first coupling protrusion that are coupled to each other at one side between both sides in the third direction, and the second coupling groove and the second coupling protrusion that are coupled to each other at another side in the third direction.

The rechargeable battery may further include a retainer between the first terminal part and the cap plate, the retainer receiving the first terminal part and being penetrated in the first direction; and a lid covering the fastener and being snap-fit coupled to the retainer.

The rechargeable battery may further include an outer insulator inserted into the terminal hole outside the cap plate, the outer insulator being between the retainer and the cap plate and between the terminal hole and the first terminal part; and an inner insulator between a lead tab of the electrode assembly connected to the first terminal part and the cap plate inside the cap plate.

A top surface of the lid may be disposed higher than an outer surface of the first terminal part.

The fastener may extend in the second direction, may protrude in a third direction crossing the first direction and the second direction, and may be inserted into the first terminal part and the second terminal part.

The first connection portion may include a supporting depression opened at an outer surface of the first terminal part, and a coupling groove extending in the third direction at the supporting depression, the second connection portion may include a supporting portion inserted into the supporting depression and a coupling protrusion extending in the third direction at the supporting portion and inserted into the coupling groove, and the fastener may include a base elongated in the second direction, and a first hook portion and a second hook portion protruding from the base in the third direction, wherein the first hook portion is inserted into a first coupling hole in the first terminal part and the second hook portion is inserted into a second coupling hole in the coupling protrusion.

The coupling groove may include a first coupling groove and a second coupling groove at respective sides in the third direction of the supporting depression, the coupling protrusion may include a first coupling protrusion and a second coupling protrusion at respective sides in the third direction of the supporting portion to be coupled to the first coupling groove and the second coupling groove, the fastener may include a first fastener and a second fastener at respective sides in the third direction of the first terminal part, the first fastener may be disposed along the second direction at one side between both sides in the third direction and is inserted into the first coupling hole and the second coupling hole in the third direction, and the second fastener may be disposed along the second direction at another side in the third direction and is inserted into the first coupling hole and the second coupling hole in the third direction.

The rechargeable battery may further include a retainer between the first terminal part and the cap plate, the retainer receiving the first terminal part and being penetrated in the first direction; and a lid covering the fastener and being snap-fit coupled to the retainer, wherein the lid covers and presses the first fastener at one side between both sides in the third direction and the second fastener at another side in the third direction.

A top surface of the lid may be disposed lower than an outer surface of the first terminal part.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
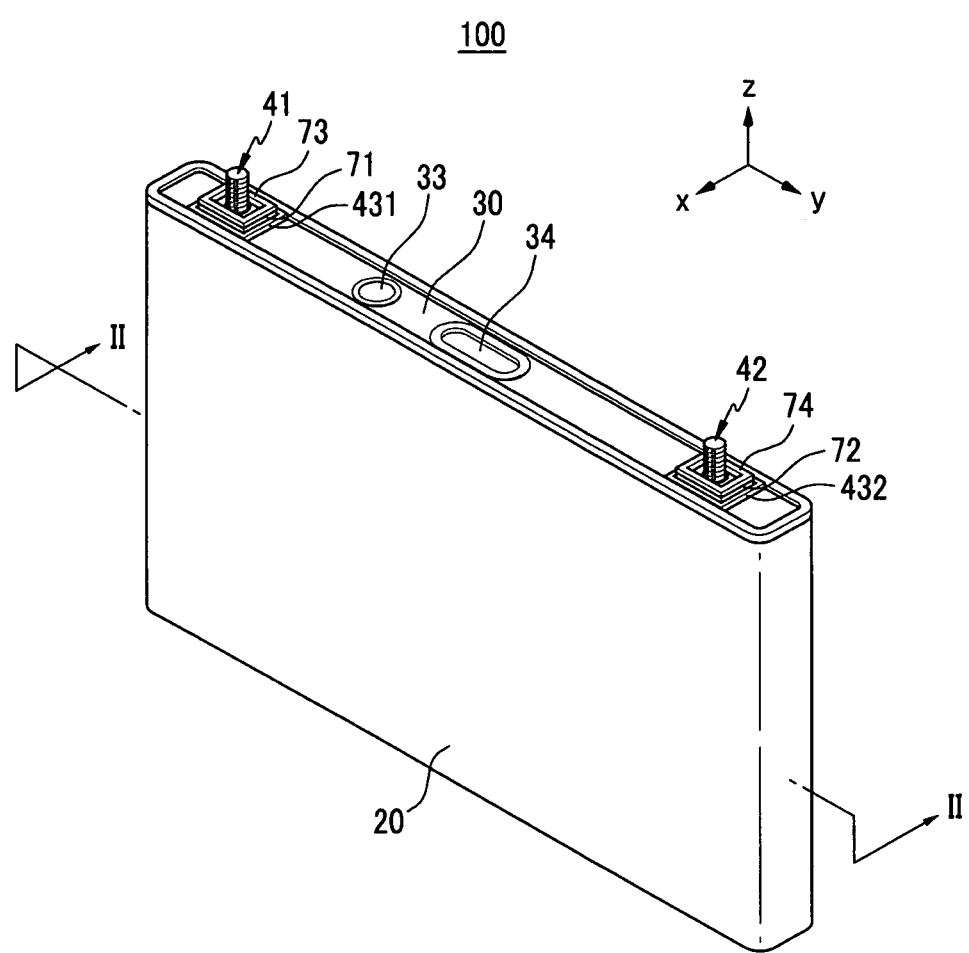
FIG. 1 illustrates a perspective view of a rechargeable battery according to an embodiment.

Korean Patent Application No. 10-2010-0078850, filed on Aug. 16, 2010, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when a layer is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
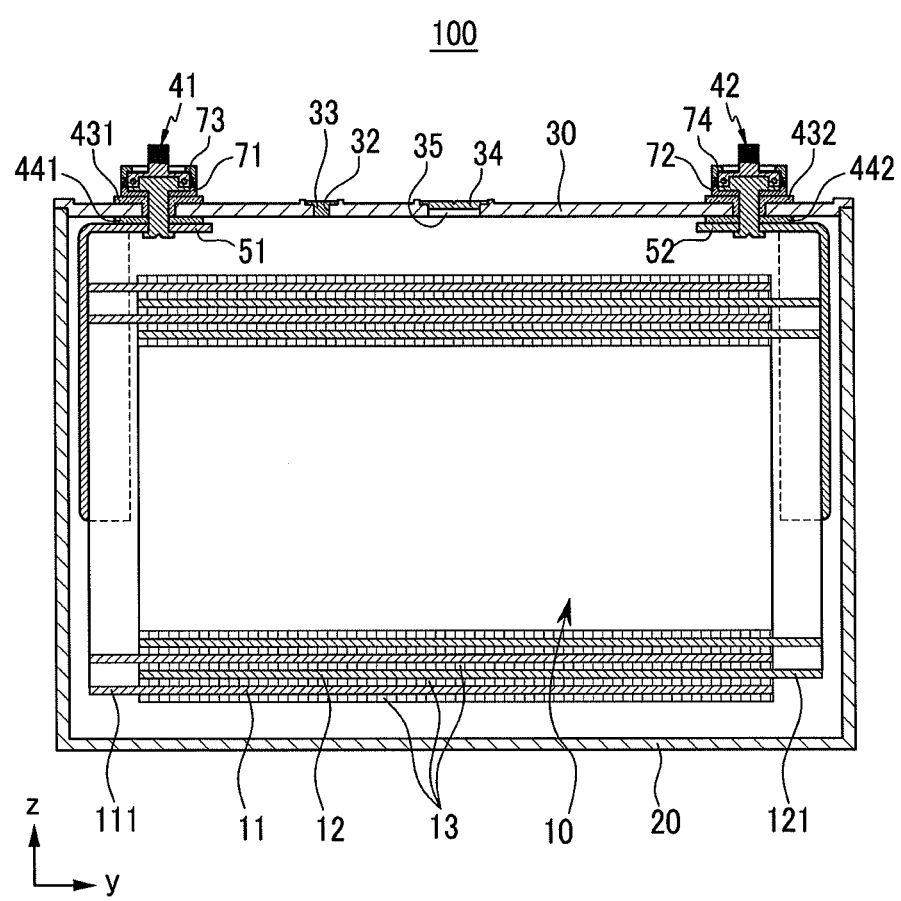
FIG. 2 illustrates a cross-sectional view taken along line II-II of FIG. 1.

FIG. 1 illustrates a perspective view of a rechargeable battery according to an embodiment. FIG. 2 illustrates a cross-sectional view taken along line II-II of FIG. 1. Referring to FIG. 1 and FIG. 2, the rechargeable battery 100 may include a case 20 accommodating an electrode assembly 10, a cap plate 30 closing and sealing an opening at one end of the case 20, electrode terminals 41 and 42 installed at the cap plate 30, and lead tabs 51 and 52 connecting the electrode terminals 41 and 42 to the electrode assembly 10.

For example, the electrode assembly 10 may include a separator 13 as an insulator and a positive electrode 11 and a negative electrode 12 on surfaces of the separator 13. The electrode assembly 10 may be formed in a jelly roll shape by winding the positive electrode 11 and negative electrode 12 together with the separator 13.

Although not illustrated, in an implementation, the electrode assembly 10 may be assembled by depositing the negative electrode 12 and the positive electrode 11 (each being made of a single metal plate) and interposing the separator 13 therebetween. In another implementation, the electrode assembly 10 may be assembled by folding and depositing the negative electrode 12, the separator 13, and the positive electrode 11 using a zigzag method (not shown).

The positive electrode 11 and the negative electrode 12 may be formed by coating an active material on a current collector made of a thin metal plate. Accordingly, the positive electrode 11 and the negative electrode 12 may include a coated region where the active material is coated on the current collector and uncoated regions 111 and 121 where the current collector is not coated with the active material. The coated region may form most of the positive electrode 11 and the negative electrode 12; and the uncoated regions 111 and 112 may be at respective sides of the coated region of the electrode assembly 10 (in the jelly roll structure).

The case 20 may wholly outline the rechargeable battery 100, e.g., may form an exterior structure of the rechargeable battery 100. The case 20 may be formed of a conductive metal, e.g., aluminum, an aluminum alloy, or nickel-plated steel. The case 20 may provide a space for accommodating the electrode assembly 10.

For example, the case 20 may have a hexahedral shape having an opening at one side or end thereof to receive the electrode assembly 10. The opening may face upwardly from the case, as shown in FIG. 1 and FIG. 2.

The cap plate 30 may have a thin plate structure and may be coupled to the opening of the case 20 to thereby seal the opening. The cap plate 30 may block or separate an inside from an outside of the sealed case 20. However, the inside and the outside or output side of the cap plate 30 may communicate with each other as desired.

The cap plate 30 may have a configuration or structure that facilitates forming and operating the rechargeable battery 100. For example, the cap plate 30 may include terminal holes 311 and 312 through which the electrode terminals 41 and 42 may pass, an electrolyte injection hole 32 for injecting an electrolyte solution, and a vent hole 35 for ensuring stability of the rechargeable battery 100 when an internal pressure thereof is excessively increased.

The electrolyte solution may be injected through the electrolyte injection hole 32 into the case 20 in a state in which the cap plate 30 is coupled to the case 20. After injection of the electrolyte solution, the electrolyte injection hole 32 may be sealed by a sealing cap 33.

The vent hole 35 may be closed and sealed by a vent plate 34 such that the vent hole 35 is maintained in a closed state when the rechargeable battery 100 is operated normally. The vent hole 35 may be opened when the internal pressure of the rechargeable battery 100 exceeds a predetermined pressure. For example, the vent plate 34 may be made of a flat material that is thinner than the cap plate 30 and may be welded around the vent hole 35.

Gas may be generated when charging and discharging the electrode assembly 10 inside the rechargeable battery 100; and the gas may thus increase the internal pressure in the case 20. When the internal pressure of the rechargeable battery 100 exceeds the predetermined pressure, the vent plate 34 may rupture and the gas may be exhausted to prevent explosion of the rechargeable battery 100.

The terminal holes 311 and 312 may penetrate the cap plate 30 such that the electrode terminals 41 and 42 may be inserted therethrough. For example, the electrode terminals 41 and 42 may be electrically connected to the positive electrode 11 and the negative electrode 12 of the electrode assembly 10 through the terminal holes 311 and 312 such that the positive electrode 11 and the negative electrode 12 may be electrically connected outside the cap plate 30.

In an implementation, the electrode terminal 41 and 42 may pass through the terminal holes 311 and 312, respectively, by coupling outer insulators 431 and 432 and inner insulators 441 and 442 thereto such that the electrode terminals 41 and 42 are electrically insulated from the cap plate 30.

The terminal holes 311 and 312, the inner insulators 441 and 442, and the outer insulators 431 and 432 may be respectively provided in the two electrode terminals 41 and 42 with the same structures, and therefore the electrode terminal 41, the terminal hole 311, the inner insulator 441, and the outer insulator 431 formed at one side will be exemplarily described.

The outer insulator 431 may be inserted into the terminal hole 311 at an outer side of the cap plate 30 to electrically insulate the electrode terminal 41 from the cap plate 30. For example, the outer insulator 431 may insulate an outer surface of the electrode terminal 41 from an outer surface of the cap plate 30 and may simultaneously insulate the outer surface of the electrode terminal 41 from an inner surface of the terminal hole 311.

The inner insulator 441 may electrically insulate the cap plate 30 from the lead tab 51 at an inner side of the cap plate 30 corresponding to the terminal hole 311. For example, the inner insulator 441 may insulate a top surface of the lead tab 51 from an inner surface of the cap plate 30 as well as the outer surface of the electrode terminal 41 from the inner surface of the cap plate 30.

The electrode terminals 41 and 42 respectively connected to the positive electrode 11 and the negative electrode 12 of the electrode assembly 10 may have the same structure; and a repeated description of the electrode terminal 42 connected to the negative electrode 12 is omitted. Thus, the electrode terminal 41 connected to the positive electrode 11 will be described.

Figure 3:
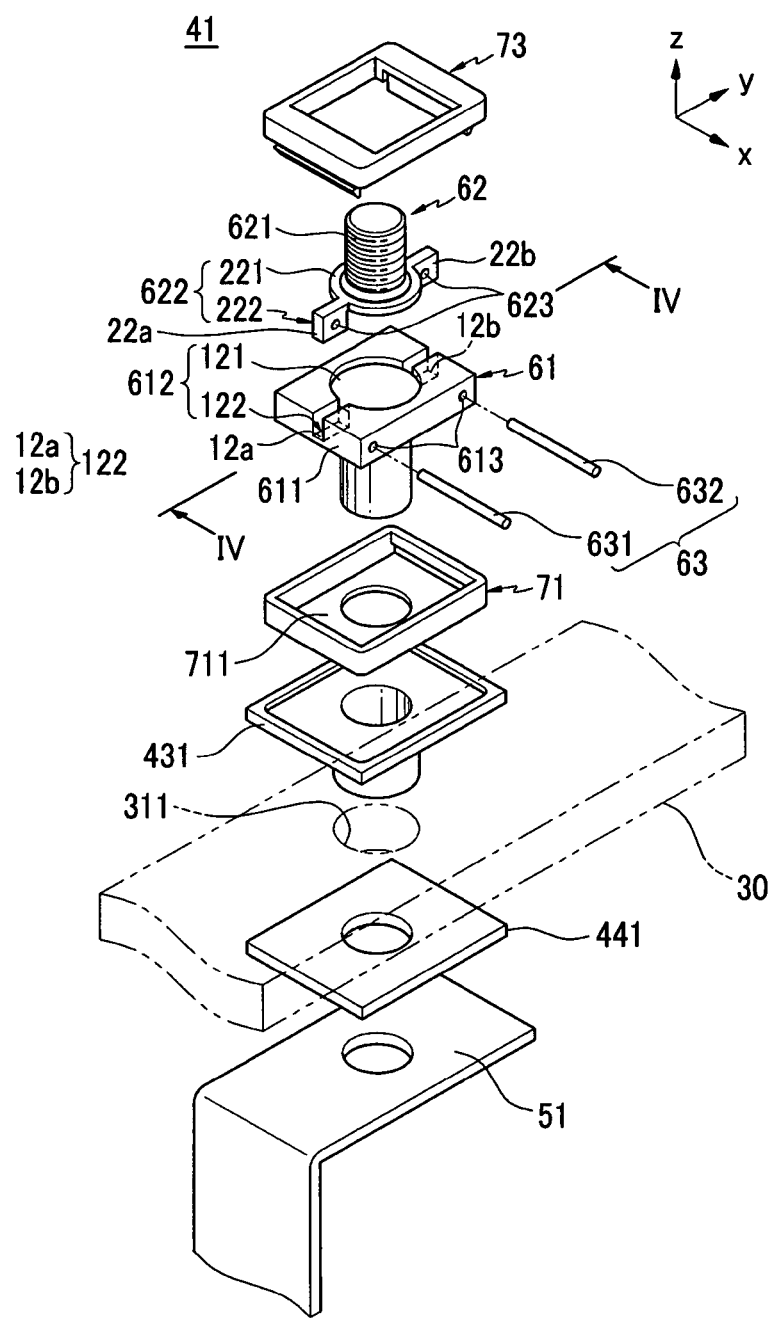
FIG. 3 illustrates an exploded perspective view of an electrode terminal, a cap plate, and a lead tab of the rechargeable battery of FIG. 1.

FIG. 3 illustrates an exploded perspective view of an electrode terminal, a cap plate, and a lead tab of the rechargeable battery of FIG. 1. Referring to FIG. 2 and FIG. 3, the electrode terminal 41 may include a first terminal part 61 passing through the terminal hole 311 of the cap plate 30, a second terminal part 62 coupled to the first terminal part 61, and a fastening member or fastener 63 coupling the first and second terminal parts 61 and 62 with each other. For example, the electrode terminal 41 may have a divided coupling structure of the first terminal part 61 and the second terminal part 62, which may have different characteristics.

For example, the first terminal part 61 may be coupled with the lead tab 51 inside the cap plate 30 by, e.g., caulking, riveting, or welding. The first terminal part 61 may deform in the process of connecting the first terminal part 61 to the lead tab 51. The second terminal part 62 may include a bolt portion 621 outside the cap plate 30.

In the state in which the first and second terminal parts 61 and 62 are coupled to each other, a bus bar 81 (see FIG. 6) and a nut 82 (see FIG. 6) may be coupled with the bolt portion 621, such that two neighboring or adjacent rechargeable batteries 100 may be coupled in series or in parallel. Accordingly, a process of coupling the first terminal part 61 and the lead tab 51 may be independent of the coupling of the second terminal part 62 and the bolt portion 621. For example, the limitation condition during the manufacturing process of the first terminal part 61 may only affect the first terminal part 61, and may not affect the second terminal part 62.

The first terminal part 61 may pass through the terminal hole 311 with the outer insulator 431 and the inner insulator 441 interposed therebetween such that the first terminal part 61 is insulated from the cap plate 30.

The outer insulator 431 may be inserted into the terminal hole 311 from outside the cap plate 30 such that the first terminal part 61 and the cap plate 30 may be electrically insulated. For example, the outer insulator 431 may insulate the outer surface of the first terminal part 61 from the outer surface of the cap plate 30 as well as the outer surface of the first terminal part 61 from the inner surface of the terminal hole 311.

The inner insulator 441 may electrically insulate between the cap plate 30 and the lead tab 51 corresponding to the terminal hole 311 inside the cap plate 30 as well as between the first terminal part 61 and the cap plate 30. For example, the inner insulator 441 may electrically insulate the inner surface of the cap plate 30 from the top surface of the lead tab 51 as well as the outer surface of the first terminal part 61 from the inner surface of the cap plate 30. In addition, the inner insulator 441 may seal between the terminal hole 311 and the first terminal part 61.

Figure 4:
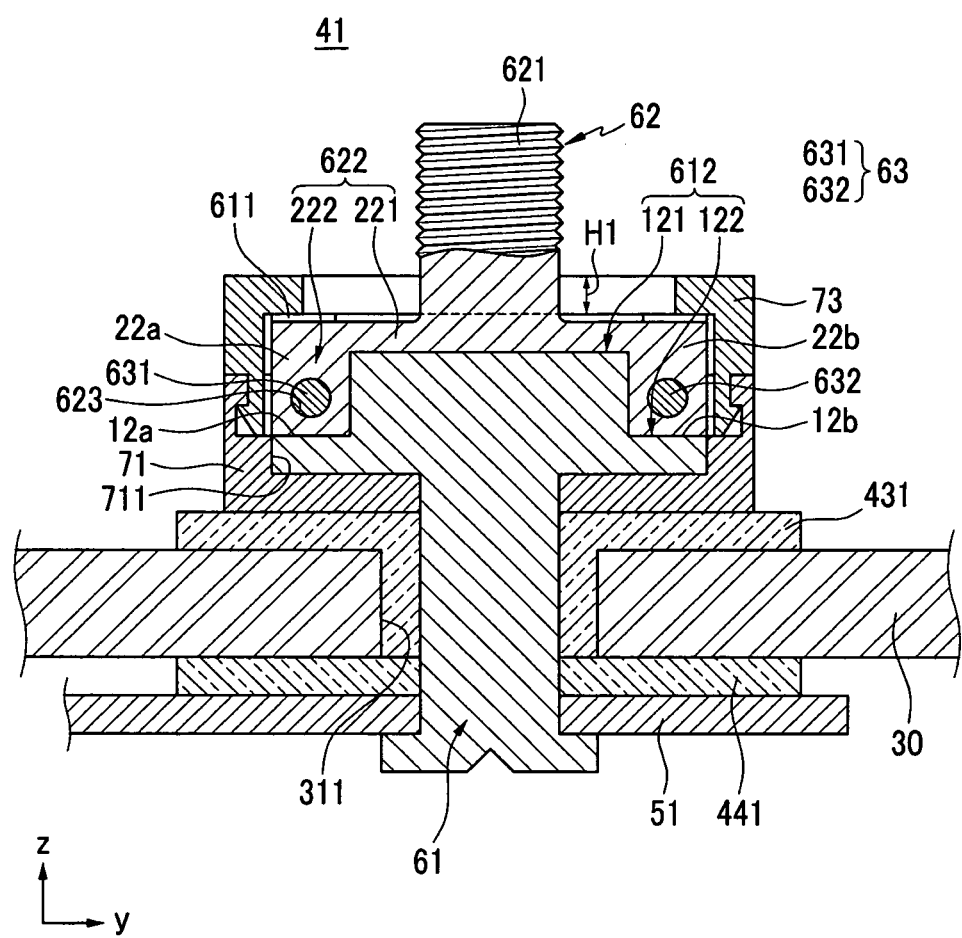
FIG. 4 illustrates an assembled cross-sectional view taken along line IV-IV of FIG. 3.

FIG. 4 illustrates an assembled cross-sectional view taken along line IV-IV of FIG. 3. Referring to FIG. 3 and FIG. 4, the second terminal part 62 may be coupled to or stacked on the first terminal part 61 in a first direction (hereinafter referred to as "z-axis direction"), e.g., a length direction of the electrode terminal 41 through an insert structure.

The first terminal part 61 may be coupled with the lead tab 51 of the electrode assembly 10 inside the cap plate 30. The first terminal part 61 may include a head portion 611 positioned outside the cap plate 30 and a first connection portion 612 in the head portion 611.

For example, the first connection portion 612 may include a supporting depression 121 opened toward the outside, e.g., upwardly, at a center of the head portion 611, and a coupling groove 122 extending along a third direction (hereinafter referred to as "y-axis direction"), which intersects the first direction, and a second direction (hereinafter referred to as "x-axis direction") at or from the supporting depression 121.

A portion of the second terminal part 62 may be inserted into the first connection portion 612; and a remaining portion may protrude away, e.g., upwardly, from the first connection portion 612. The second terminal part 62 may include the bolt portion 621 at a top of the second terminal part 62 and a second connection portion 622 under the bolt portion 621 and coupled to the first connection portion 612. The nut 82 for fixing the bus bar 81 may be coupled to the bolt portion 621.

For example, the second connection portion 622 may include a supporting portion 221 inserted into the supporting depression 121 and a coupling protrusion 222 extending along the y-axis direction from the supporting portion 221 and inserted into and coupled with the coupling groove 122.

The coupling groove 122 of the first connection portion 612 may have a depth in the z-axis direction that is deeper than a depth of the supporting depression 121. The coupling protrusion 222 of the second connection portion 622 may have a height in the z-axis direction that is greater than a height of the supporting portion 221. Accordingly, in a state in which the supporting portion 221 is inserted into and supported by the supporting depression 121, the coupling protrusion 222 may be inserted more deeply into the coupling groove 122 such that the first and second terminal parts 61 and 62 may be strongly coupled.

The second connection portion 622 of the second terminal part 62 may be inserted into the first connection portion 612 of the first terminal part 61 in the z-axis direction; and the coupling protrusion 222 of the second terminal part 62 may be coupled with the coupling groove 122 of the first terminal part 61. Accordingly, even in the event of deformation and/or applied force during a connection process of the first terminal parts 61 and the lead tab 51, the bolt portion 621 and the nut 82 may still be stably coupled in the second terminal part 62.

In addition, when the bus bar 81 is positioned on the bolt portion 621 and the nut 82 is coupled thereto, torque between the bolt portion 621 and the nut 82 may be held by the coupling protrusion 222 and the coupling groove 122. For example, in spite of the coupling force of the bolt portion 621 and the nut 82 in the second terminal part 62, the connection of the first terminal part 61 and the lead tab 51 may not be influenced.

In an implementation, a plurality of coupling grooves 122 and coupling protrusions 222 may be respectively disposed at equal intervals with regard to a circular or circumferential direction of the supporting depression 121 and the supporting portion 221 such that they are correspondingly coupled to each other. For example, in the present embodiment, the coupling groove 122 may include a first coupling groove 12a and a second coupling groove 12b at respective sides of the supporting depression 121 relative to the y-axis direction. The coupling protrusion 222 may include a first coupling protrusion 22a and a second coupling protrusion 22b at respective sides of the supporting portion 221 relative to the y-axis direction. The first and second coupling protrusions 22a and 22b may be coupled to the first coupling groove 12a and the second coupling groove 12b, respectively. The first and second coupling grooves 12a and 12b and the first and second coupling protrusions 22a and 22by that are coupled to each other at respective sides relative to the y-axis direction may maintain coupling balance along the circular or circumferential direction of the first and second terminal parts 61 and 62.

A fastening member or fastener 63 may couple the first and second connection portions 612 and 622 of the first and second terminal parts 61 and 62 in a direction intersecting the z-axis direction, e.g., the x-axis direction. However, in an implementation, the direction intersecting the z-axis direction may be not necessarily be perpendicular to the z axis, but rather may be inclined relative to the z axis. As illustrated in FIG. 3, the fastener 63 may penetrate the first and second connection portions 612 and 622 in the x-axis direction to couple the first and second connection portions 612 and 622, thereby maintaining a connection state of the first and second terminal parts 61 and 62 in the z-axis direction.

The first and second terminal parts 61 and 62 may suppress division or movement in the x- and y-axis directions due to the coupling of the first and second connection portions 612 and 622. The fastener 63 may suppress division or movement in the z-axis direction of the first and second terminal parts 61 and 62. Accordingly, the first and second terminal parts 61 and 62 may maintain the connection state, and, as they may be made of a conductive material, they may establish an electrical connection therebetween. In an implementation, the fastener 63 may be made of, e.g., a synthetic resin injection material.

For example, the fastener 63 may be formed as a pin that may be inserted into a first coupling hole 613 passing through the head part 611 (and connected to the coupling groove 122) of the first terminal part 61 and a second coupling hole 623 in the coupling protrusion 222 in the x-axis direction.

In the present embodiment, the coupling groove 122 may include the first and second coupling grooves 12a and 12b; and the coupling protrusion 222 may include the first and second coupling protrusions 22a and 22b coupled to the first and second coupling grooves 12a and 12b.

Accordingly, the fastener 63 may include first and second pins 631 and 632 provided to respective sides of the first terminal part 61 relative to the y-axis direction; and first and second coupling holes 613 and 623 may be formed at respective sides in the y-axis direction of the first and second terminal parts 61 and 62.

The first pin 631 may be inserted into the first and second coupling holes 613 and 623 in the x-axis direction at one side (e.g., a left side in FIG. 3 and FIG. 4) of the first and second terminal parts 61 and 62, and the second pin 632 may be inserted into the first and second coupling holes 613 and 623 in the x-axis direction at another side (e.g., a right side in FIG. 3 and FIG. 4) of the first and second terminal parts 61 and 62.

The first and second pins 631 and 632 may be provided at respective sides relative to the y-axis direction such that balance may be maintained for the coupling of the first coupling groove 12a and the first coupling protrusion 22a as well as the coupling of the second coupling groove 12b and the second coupling protrusion 22b.

Referring to FIG. 1 and FIG. 2, the rechargeable battery of the present embodiment may further include retainers 71 and 72 receiving the first terminal part 61, and lids 73 and 74 coupled to the retainers 71 and 72 and partially covering the first terminal part 61.

The retainers 71 and 72 and the lids 73 and 74 may be identically formed for the two electrode terminals 41 and 42, and, for convenience, a repeated description for the electrode terminal 42 is omitted. Thus, the retainer 71 and the lid 73 for the electrode terminal 41 will be described.

Referring to FIG. 3 and FIG. 4, the retainer 71 may be between the first terminal part 61 and the cap plate 30 to receive the first terminal part 61, thereby partially containing or accommodating the first terminal part 61 in the z-axis direction. The lid 73 may be snap-fit coupled to the retainer 71 while covering the fastener 63. The retainer 71 and the lid 73 may be formed of, e.g., a synthetic resin injection material. Accordingly, the retainer 71 and the lid 73 may prevent the electrode terminal 41 from being externally shorted.

The retainer 71 may have a recess portion 711 outside the cap plate 30 to receive the head portion 611 of the first terminal part 61. The lid 73 may be snap-fit coupled to the retainer 71 such that the lid 73 partially covers the first and second connection portions 612 and 622. Accordingly, the first and second terminal parts 61 and 62 may be further strongly coupled and the electrical connection may be further enforced or ensured.

Figure 5:
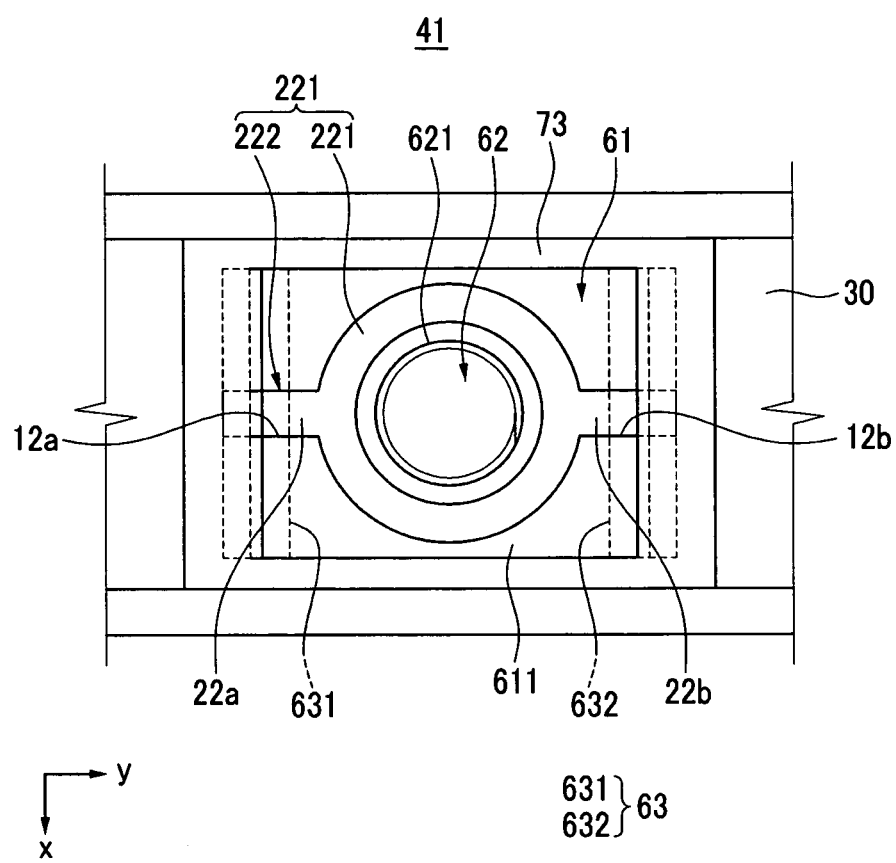
FIG. 5 illustrates an assembled top plan view of the electrode terminal, cap plate, and lead tab of FIG. 3.

FIG. 5 illustrates an assembled top plan view of the electrode terminal, cap plate, and lead tab of FIG. 3. Referring to FIG. 4 and FIG. 5, the lid 73 may cover the first coupling groove 12a and the first coupling protrusion 22a (that are coupled to each other) at one side of the electrode terminal 41 (e.g., the left side in the y-axis direction) and may cover the second coupling groove 12b and the second coupling protrusion 22b that are coupled to each other at another side of the electrode terminal 41 (e.g., the right side in the y-axis direction).

For example, the first and second connection portions 612 and 622 may be symmetrically covered and pressed at sides thereof in the y-axis direction. Accordingly, a stable electrical connection may be established between the first and second terminal parts 61 and 62.

In an implementation, the lid 73 may cover ends of the first and second pins 631 and 632 (coupling the first and second connection portions 612 and 622) with side surfaces thereof such that release of the first and second pins 631 and 632 may be prevented. In the state in which the first and second terminal parts 61 and 62 are coupled and the lid 73 is coupled to the retainer 71, a top surface of the lid 73 may be higher (by a height difference H1) than an outer or top surface of the first terminal part 61, e.g., the head portion 611 (referring to FIG. 4).

Figure 6:
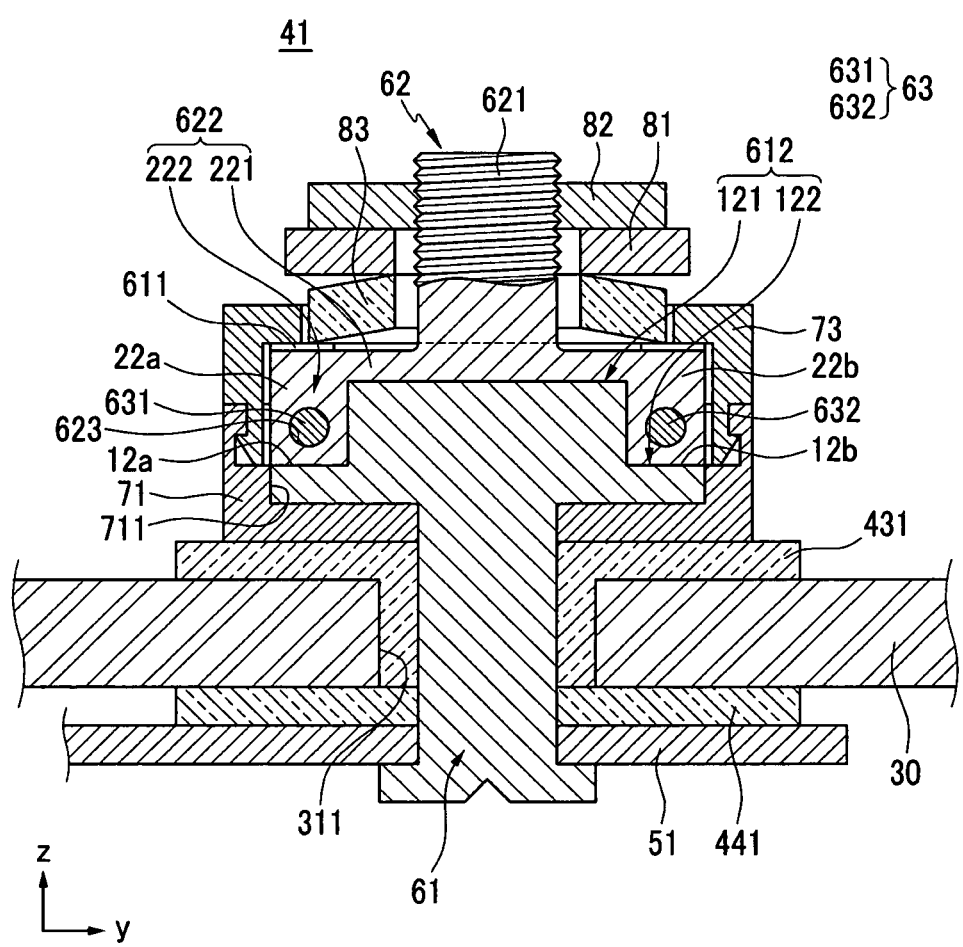
FIG. 6 illustrates a cross-sectional view of a process of connecting a bus bar to an electrode terminal of the rechargeable battery of FIG. 1.

FIG. 6 illustrates a cross-sectional view of a process connecting a bus bar to an electrode terminal of the rechargeable battery of FIG. 1. Referring to FIG. 6, the height difference H1 (see FIG. 4) between the top surface of the lid 73 and the top surface of the head portion 611 may facilitate application of a damper structure when the bus bar 81 is coupled with the electrode terminal 41.

For example, a damper 83 formed of a conductive material may be interposed between the first terminal part 61 and the bus bar 81. When fastening of the nut 82 to the bolt portion 621, the damper 83 may surface-contact between the bus bar 81 and the head portion 611 of the first terminal part 61, thereby forming a conductive structure having low resistance. FIG. 6 illustrates the state prior to forming the surface contact by fastening the nut 82 to the bolt portion 621.

The damper 83 may maintain the electrical connection structure of the bus bar 81 even in the event of, e.g., impact or vibration. The damper 83 may be separately formed from the bus bar 81, as shown in FIG. 6. In an implementation, the damper 83 may be integrally formed with the bus bar 81 (not illustrated). In an implementation, the damper 83 may be formed as, e.g., a spring washer or a dish spring.

Referring to FIG. 2 and FIG. 3, the lead tabs 51 and 52 may have one side thereof connected to the first terminal part 61 of the electrode terminals 41 and 42 and another side thereof connected to the uncoated regions 111 and 121 at respective ends of the electrode assembly 10.

Next, another embodiment will be described. In the next embodiment, a repeated description of the same configurations as the previous embodiment is omitted, and different configurations will be described.

Figure 7:
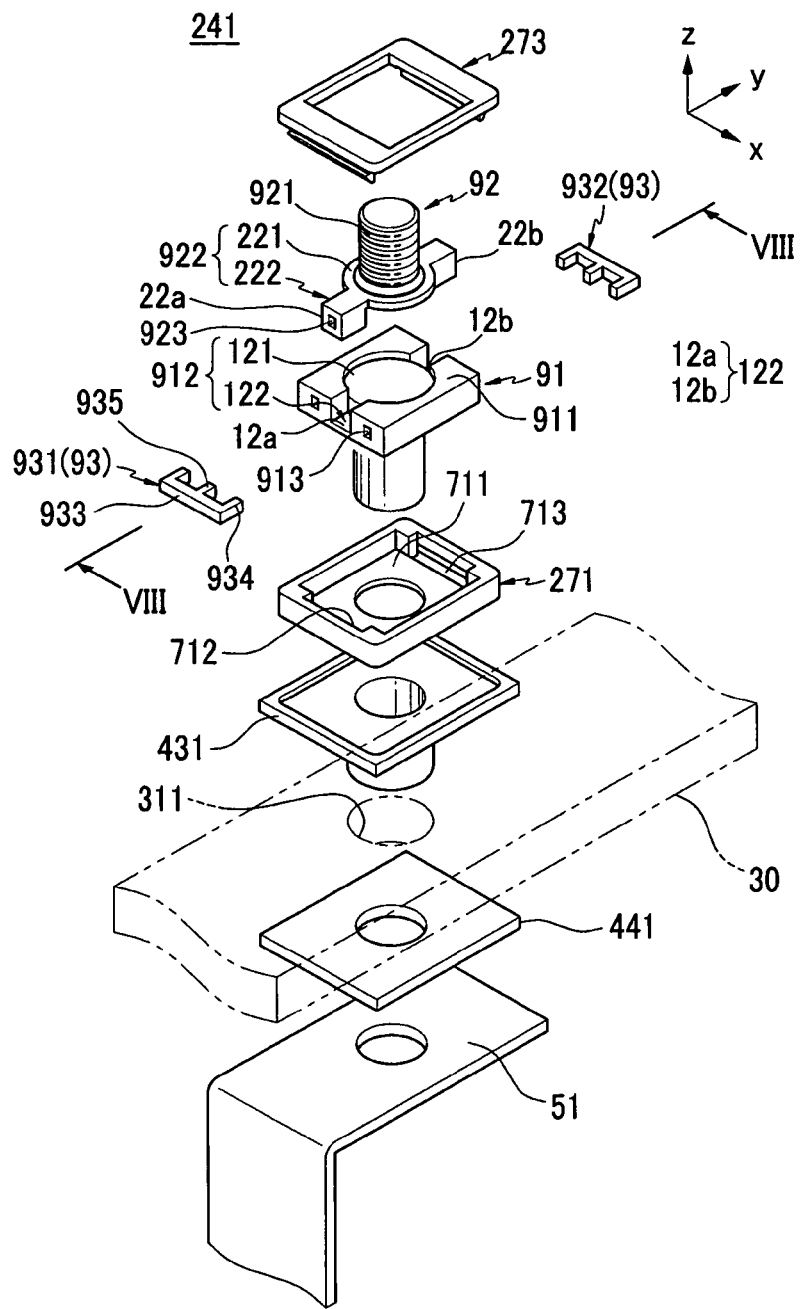
FIG. 7 illustrates an exploded perspective view of an electrode terminal, a cap plate, and a lead tab in a rechargeable battery according to another embodiment.
Figure 8:
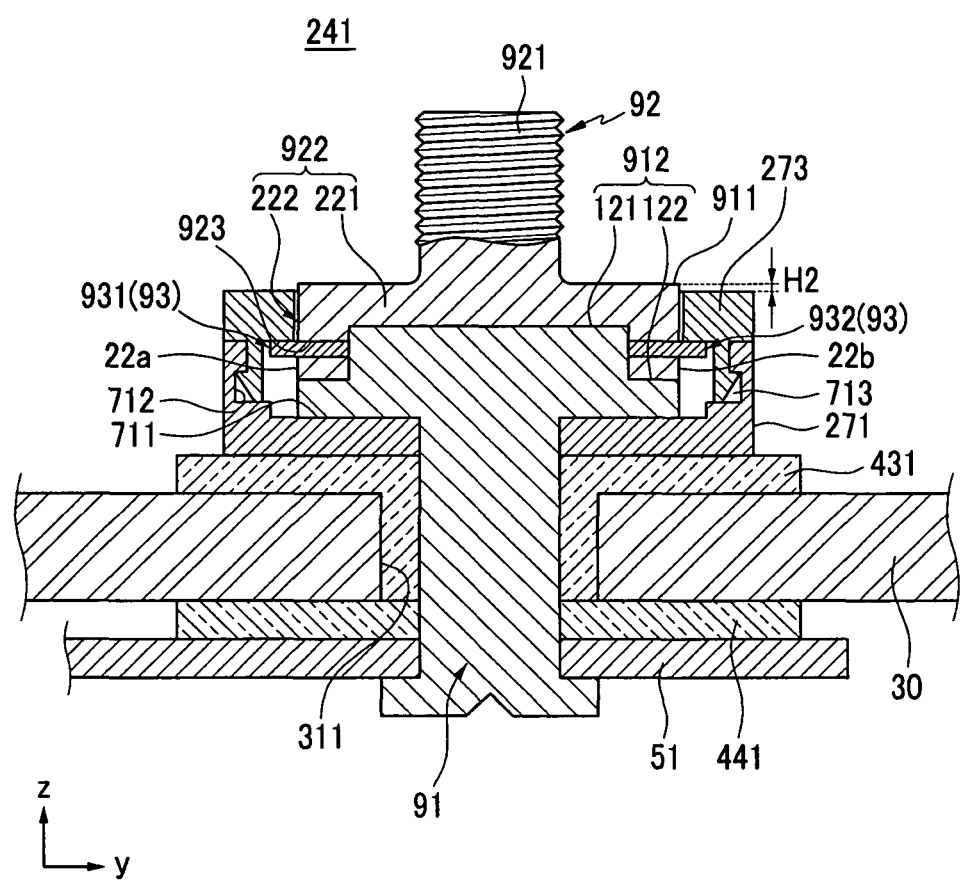
FIG. 8 illustrates an assembled cross-sectional view taken along line VIII-VIII of FIG. 7.

FIG. 7 illustrates an exploded perspective view of an electrode terminal, a cap plate, and a lead tab in a rechargeable battery according to another embodiment. FIG. 8 illustrates an assembled cross-sectional view taken along line VIII-VIII of FIG. 7.

As described above with respect to the previous embodiment, the electrode terminal 41 may include the first coupling hole 613 extending in the x-axis direction in the first terminal part 61 and the second coupling hole 623 extending in the x-axis direction in the second terminal part 62. Thus, the fastener 63 may be inserted in the x-axis direction into the first and second coupling holes 613 and 623 to maintain the coupling state of the first and second connection portions 612 and 622.

However, referring to FIG. 7 and FIG. 8, in an electrode terminal 241 of the present embodiment, a first terminal part 91 may include a first coupling hole 913 extending in the y-axis direction and a second terminal part 92 may include a second coupling hole 923 extending in the y-axis direction. The first and second coupling holes 913 and 923 may extend parallel with one another. A fastening member or fastener 93 may be inserted into the first and second coupling holes 913 and 923 in the y-axis direction such that a coupling state of first and second connection portions 912 and 922 of the first and second terminal parts 91 and 92 may be maintained.

For example, the fastener 93 may be elongated in the x-axis direction, e.g., may have a longer length or dimension in the x-axis direction, and may protrude in the y-axis direction, e.g., may include protrusions extending in the y-axis direction. Thus, the fastener 93 may be inserted into the first and second terminal parts 91 and 92 and may maintain the coupling state thereof. For example, the fastener 93 may include a base 933 elongated or extending in the x-axis direction and first and second hook portions 934 and 935 protruding from the base 933 in the y-axis direction. The first hook portion 934 may be formed as a pair at sides of the second hook portion 935.

The first hook portion 934 may be inserted into the first coupling hole 913 of the first terminal part 91; and the second hook portion 935 may be inserted into the second coupling hole 923 of the coupling protrusion 222. The first coupling hole 913 may be formed as a pair corresponding to the first hook portion 934.

In an implementation, the fastener 93 may include a first fastener 931 and a second fastener 932 at respective sides of the first terminal part 91 relative to the y-axis direction. The first fastener 931 may extend along the x-axis direction at one side (e.g., the left side in FIG. 7 and FIG. 8 in the y-axis direction) such that it may be inserted into the first coupling hole 913 and the second coupling hole 923 in the y-axis direction. The second coupling hole 923 may be formed in a first coupling protrusion 22a of the second terminal part 92 (that is coupled to a first coupling groove 12a of the first terminal part 91).

The second fastening member 932 may extend along the x-axis direction at another side (e.g., the right side in FIG. 7 and FIG. 8 in the y-axis direction) such that it may be inserted into the first coupling hole 913 and the second coupling hole 923 in the y-axis direction. The second coupling hole 923 may be formed in a second coupling protrusion 22b of the second terminal part 92 (that is coupled to a second coupling groove 12b of the first terminal part 91).

The second coupling hole 923 may extend along the y-axis direction and may correspond to the second hook portion 935. Accordingly, when they are formed with the same material, the coupling protrusion 222 and the coupling groove 122 of the present embodiment may be larger than the coupling protrusion 222 and the coupling groove 122 of the previous embodiment.

A retainer 271 may include expansion portions 712 and 713 for accommodating the first and second fastening members 931 and 932 at sides of a recess portion 711 that accommodates the first terminal part 91. The retainer 271 may be interposed between the first terminal part 91 and the cap plate 30 to accommodate the first terminal part 91 and the first and second fastening members 931 and 932 and may be penetrated by the first terminal part 91 in the z-axis direction.

Figure 9:
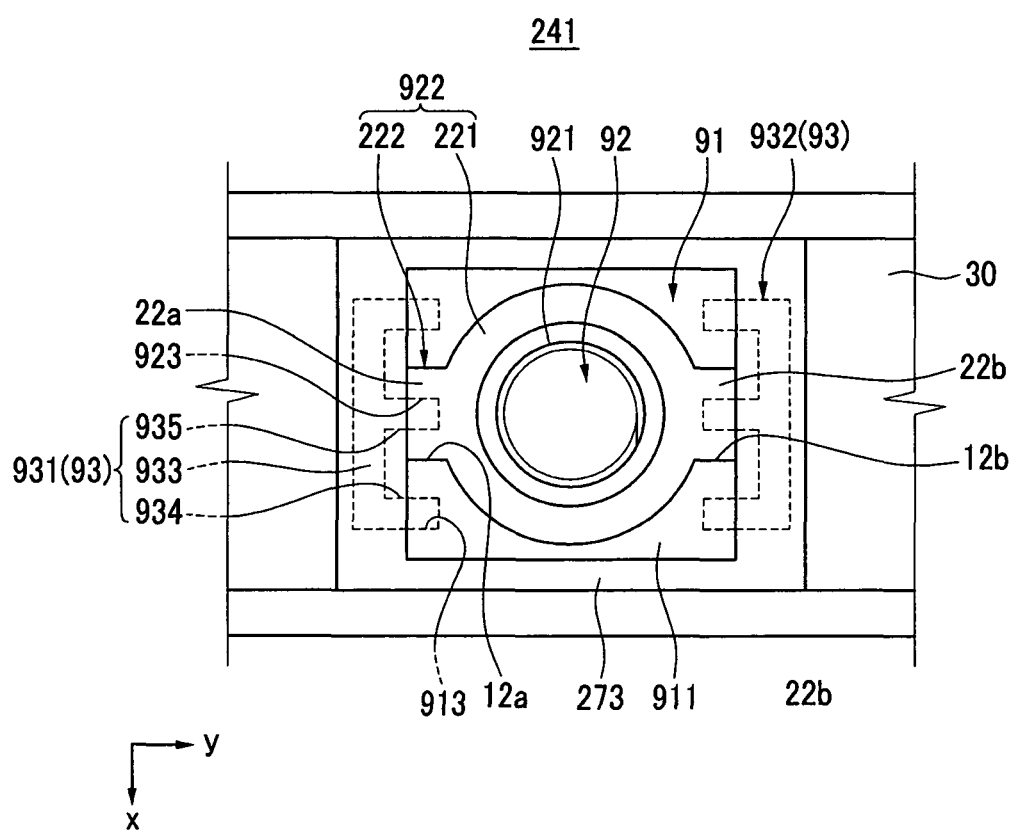
FIG. 9 illustrates an assembled top plan view of the electrode terminal, cap plate, and lead tab of FIG. 7.

FIG. 9 illustrates an assembled top plan view of the electrode terminal, the cap plate, and the lead tab of FIG. 7. Referring to FIG. 9, a lid 273 may cover the first and second fastening members 931 and 932 and may be snap-fit coupled to the retainer 271. Accordingly, the lid 273 may press and cover the first fastener 931 at one side (e.g., the left side in FIG. 7 and FIG. 8); and the second fastener 932 at another side (e.g., the right side of FIG. 7 and FIG. 8) of the electrode terminal 241.

The first and second fastening members 931 and 932 may couple the first and second terminal parts 91 and 92 to each other; and the lid 273 may be snap-fit coupled to the retainer 271, thereby pressing the first and second fastening members 931 and 932. Accordingly, the first and second terminal parts 91 and 92 may be strongly coupled, thereby ensuring a good electrical connection.

A top surface of the lid 273 may be disposed lower by a height difference H2 than an outer or top surface of a head portion 911 of the first terminal part 91 (referring to FIG. 8). This height difference H2 may facilitate establishment of an electrical connection between the bus bar and the outer surface of the head portion 911 of the first terminal part 91 when the bus bar is installed to a bolt portion 921 and the nut (not shown) is coupled thereto.

By way of summation and review, electrode terminals in general may have different coupling structures at different ends thereof. Accordingly, the electrode terminal may have many limitation conditions with regard to a manufacturing process due to characteristics of the, e.g., caulking, the riveting, or the welding, and thus deviations in quality may occur. For example, in order to ensure a predetermined level of quality, processing costs of the electrode terminal may be increased.

The embodiments provide a rechargeable battery that overcomes a processing limitation condition of an electrode terminal and ensures quality of the electrode terminal, thereby reducing processing costs.

According to an embodiment, first and second connection portions of the first and second terminal parts may be coupled in the first and second directions by using the fastener to form the electrode terminal. Thus, portions having different coupling structures and different characteristics may be divided.

For example, the second terminal part may be coupled to the first terminal part (coupled to the lead tab through caulking, riveting, or welding inside the cap plate) to form the electrode terminal. Thus, limitations of processing of the electrode terminal may be overcome and the predetermined level of quality may be realized. Accordingly, processing costs of the electrode terminal may be reduced.

In the first and second terminal parts, the first and second coupling portions and the fastener may be covered by the retainer and the lid such that an outer state of the electrode terminal may be improved. For example, the retainer and the lid may be formed of insulator material such that an undesirable external short of the electrode terminal may be prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
an electrode assembly including a positive electrode and a negative electrode formed on both surfaces of a separator;
a case accommodating the electrode assembly;
a cap plate closing an opening of one side of the case; and
an electrode terminal installed to the cap plate, wherein the electrode terminal includes:
a first terminal part installed to a terminal hole of the cap plate, connected to the electrode assembly inside the case, and protruding outside the cap plate thereby forming a first connection portion,
a second terminal part forming a second connection portion coupled to the first connection portion in a first direction determined along a length of the electrode terminal and protruding from the first terminal part, and
a fastener coupling the first connection portion and the second connection portion in a second direction intersecting the first direction,
wherein:
the first connection portion includes:
a supporting depression opened at an outer surface of the first terminal part, and
a coupling groove extended in a third direction intersecting the second direction at the supporting depression, and
the second connection portion includes:
a supporting portion inserted into the supporting depression, and
a coupling protrusion extended in the third direction at the supporting portion and inserted into the coupling groove.

2. The rechargeable battery as claimed in claim 1, wherein the fastener penetrates the first connection portion and the second connection portion in the second direction to couple the first terminal part and the second terminal part.

3. The rechargeable battery as claimed in claim 2, wherein:
the coupling groove has a depth in the first direction that is deeper than a depth of the supporting depression, and
the coupling protrusion has a height in the first direction that is greater than a height of the supporting portion.

4. The rechargeable battery as claimed in claim 2, wherein the fastener includes a pin inserted into:
a first coupling hole in the first terminal part and connected to the coupling groove, and
a second coupling hole in the coupling protrusion.

5. The rechargeable battery as claimed in claim 2, wherein:
the coupling groove includes a first coupling groove and a second coupling groove at respective sides in the third direction of the supporting depression, and
the coupling protrusion includes a first coupling protrusion and a second coupling protrusion at respective sides in the third direction of the supporting portion and coupled to the first coupling groove and the second coupling groove, respectively.

6. The rechargeable battery as claimed in claim 5, wherein:
the fastener includes a first pin and a second pin at sides of the first terminal part along the third direction,
the first pin is inserted into a first coupling hole and a second coupling hole in the second direction at one side between both sides in the third direction, and
the second pin is inserted into a first coupling hole and a second coupling hole in the second direction at another side in the third direction.

7. The rechargeable battery as claimed in claim 5, further comprising:
a lid covering the fastening member and snap-fit coupled to a retainer,
wherein the lid covers the first coupling groove and the first coupling protrusion that are coupled to each other at one side between both sides in the third direction, and the second coupling groove and the second coupling protrusion that are coupled to each other at another side in the third direction.

8. The rechargeable battery as claimed in claim 2, further comprising:
a retainer between the first terminal part and the cap plate, the retainer receiving the first terminal part and being penetrated in the first direction; and
a lid covering the fastener and being snap-fit coupled to the retainer.

9. The rechargeable battery as claimed in claim 8, further comprising:
an outer insulator inserted into the terminal hole outside the cap plate, the outer insulator being between the retainer and the cap plate and between the terminal hole and the first terminal part; and
an inner insulator between a lead tab of the electrode assembly connected to the first terminal part and the cap plate inside the cap plate.

10. The rechargeable battery as claimed in claim 8, wherein a top surface of the lid is disposed higher than an outer surface of the first terminal part.

11. A rechargeable battery, comprising:
an electrode assembly including a positive electrode and a negative electrode formed on both surfaces of a separator;
a case accommodating the electrode assembly;
a cap plate closing an opening of one side of the case; and
an electrode terminal installed to the cap plate, wherein the electrode terminal includes:
a first terminal part installed to a terminal hole of the cap plate, connected to the electrode assembly inside the case, and protruding outside the cap plate thereby forming a first connection portion,
a second terminal part forming a second connection portion coupled to the first connection portion in a first direction determined along a length of the electrode terminal and protruding from the first terminal part, and
a fastener coupling the first connection portion and the second connection portion in a second direction intersecting the first direction, the fastener extending in the second direction, protruding in a third direction crossing the first direction and the second direction, and being inserted into the first terminal part and the second terminal part.

12. The rechargeable battery as claimed in claim 11, wherein:
the first connection portion includes:
a supporting depression opened at an outer surface of the first terminal part, and
a coupling groove extending in the third direction at the supporting depression,
the second connection portion includes:
a supporting portion inserted into the supporting depression and
a coupling protrusion extending in the third direction at the supporting portion and inserted into the coupling groove, and
the fastener includes:
a base elongated in the second direction, and
a first hook portion and a second hook portion protruding from the base in the third direction, wherein the first hook portion is inserted into a first coupling hole in the first terminal part and the second hook portion is inserted into a second coupling hole in the coupling protrusion.

13. The rechargeable battery as claimed in claim 12, wherein:
the coupling groove includes a first coupling groove and a second coupling groove at respective sides in the third direction of the supporting depression,
the coupling protrusion includes a first coupling protrusion and a second coupling protrusion at respective sides in the third direction of the supporting portion to be coupled to the first coupling groove and the second coupling groove,
the fastener includes a first fastener and a second fastener at respective sides in the third direction of the first terminal part,
the first fastener is disposed along the second direction at one side between both sides in the third direction and is inserted into the first coupling hole and the second coupling hole in the third direction, and
the second fastener is disposed along the second direction at another side in the third direction and is inserted into the first coupling hole and the second coupling hole in the third direction.

14. The rechargeable battery as claimed in claim 13, further comprising:
a retainer between the first terminal part and the cap plate, the retainer receiving the first terminal part and being penetrated in the first direction; and
a lid covering the fastener and being snap-fit coupled to the retainer,
wherein the lid covers and presses the first fastener at one side between both sides in the third direction and the second fastener at another side in the third direction.

15. The rechargeable battery as claimed in claim 14, wherein a top surface of the lid is disposed lower than an outer surface of the first terminal part.

* * * * *